United States Patent
Schwartz et al.

(10) Patent No.: US 10,486,096 B2
(45) Date of Patent: Nov. 26, 2019

(54) AXIAL FLOW AIR FILTER ELEMENT

(71) Applicant: CUMMINS FILTRATION IP, INC., Columbus, IN (US)

(72) Inventors: Scott W. Schwartz, Cottage Grove, WI (US); Mark A. Terres, Shakopee, MN (US); Gregory K. Loken, Stoughton, WI (US); Jeremiah J. Cupery, Madison, WI (US); Barry M. Verdegan, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 175 days.

(21) Appl. No.: 15/508,021

(22) PCT Filed: Sep. 8, 2015

(86) PCT No.: PCT/US2015/048963
§ 371 (c)(1),
(2) Date: Mar. 1, 2017

(87) PCT Pub. No.: WO2016/040332
PCT Pub. Date: Mar. 17, 2016

(65) Prior Publication Data
US 2017/0291132 A1 Oct. 12, 2017

Related U.S. Application Data

(60) Provisional application No. 62/048,112, filed on Sep. 9, 2014.

(51) Int. Cl.
*B01D 46/00* (2006.01)
*B01D 46/10* (2006.01)

(52) U.S. Cl.
CPC ....... *B01D 46/106* (2013.01); *B01D 46/0002* (2013.01); *B01D 46/10* (2013.01);
(Continued)

(58) Field of Classification Search
CPC .. B01D 46/525; B01D 46/526; B01D 46/527; B01D 2271/02; B01D 2271/022;
(Continued)

(56) References Cited

U.S. PATENT DOCUMENTS

| | | |
|---|---|---|
| 4,824,564 A | 4/1989 | Edwards et al. |
| 5,753,120 A | 5/1998 | Clausen et al. |

(Continued)

OTHER PUBLICATIONS

International Search Report and Written Opinion of the International Searching Authority issued in PCT/US2015/048963, dated Dec. 4, 2015.

*Primary Examiner* — Robert Clemente
(74) *Attorney, Agent, or Firm* — Foley & Lardner LLP

(57) ABSTRACT

An axial flow air filter system is described. The system includes an axial flow filter element having a filter media. The filter media includes an inlet face and an outlet face, the inlet face spaced apart from the outlet face. The axial flow filter element includes an upper support ring adjacent to the inlet face of the filter media. The upper support ring circumscribes the filter media and supports an upper seal. The upper seal forms a seal with a housing when the filter element is received in the housing. The axial flow filter element further includes a lower support ring adjacent to the outlet face of the filter media. The lower support ring circumscribes the filter media. In some arrangements, the lower support ring does not include a seal.

24 Claims, 8 Drawing Sheets

(52) U.S. Cl.
CPC ...... *B01D 2271/02* (2013.01); *B01D 2275/20* (2013.01); *B01D 2279/60* (2013.01)

(58) Field of Classification Search
CPC ............ B01D 2271/027; B01D 46/106; B01D 2279/60; B01D 46/0002
See application file for complete search history.

(56) References Cited

U.S. PATENT DOCUMENTS

| | | | |
|---|---|---|---|
| 8,397,920 B2 * | 3/2013 | Moy | B01D 25/001 210/493.1 |
| 8,506,668 B2 | 8/2013 | Swanson et al. | |
| 2002/0152732 A1 | 10/2002 | Kallsen et al. | |
| 2002/0185008 A1 * | 12/2002 | Anderson | B01D 46/0004 95/287 |
| 2004/0255783 A1 | 12/2004 | Graham et al. | |
| 2005/0166561 A1 * | 8/2005 | Schrage | B01D 46/0001 55/498 |
| 2005/0229561 A1 * | 10/2005 | Nepsund | B01D 46/0004 55/481 |
| 2006/0090434 A1 * | 5/2006 | Brown | B01D 46/527 55/498 |
| 2007/0090040 A1 | 4/2007 | Bauder et al. | |
| 2007/0175194 A1 * | 8/2007 | Nepsund | B01D 46/0004 55/498 |
| 2008/0115470 A1 * | 5/2008 | Kuempel | B01D 46/0005 55/357 |
| 2009/0211450 A1 * | 8/2009 | Mosset | B01D 46/0005 95/273 |
| 2009/0266041 A1 * | 10/2009 | Schrage | B01D 46/0005 55/498 |
| 2009/0301045 A1 * | 12/2009 | Nelson | B01D 46/0001 55/498 |
| 2009/0320423 A1 * | 12/2009 | Merritt | B01D 46/0001 55/498 |
| 2009/0320424 A1 * | 12/2009 | Merritt | B01D 46/0001 55/502 |
| 2011/0197556 A1 * | 8/2011 | Brown | B01D 46/527 55/498 |
| 2014/0165518 A1 | 6/2014 | Ohashi et al. | |
| 2015/0204282 A1 * | 7/2015 | Merritt | B01D 46/0023 55/482 |

* cited by examiner

AXIAL FLOW AIR FILTER ELEMENT

CROSS-REFERENCE TO RELATED APPLICATIONS

This application is a U.S. National Stage Application of PCT Application No. PCT/US2015/048963, filed Sept. 8, 2015, which claims priority to U.S. Provisional Patent Application No. 62/048,112, entitled "AXIAL FLOW AIR FILTER ELEMENT," and filed on Sep. 9, 2014, which are herein incorporated by reference in their entirety and for all purposes.

TECHNICAL FIELD

The present disclosure relates generally to air filtration systems having a replaceable axial flow air filter element.

BACKGROUND

Internal combustion engines generally combust a mixture of fuel (e.g., gasoline, diesel, natural gas, etc.) and air. Prior to entering the engine, the intake air is typically passed through a filter element to remove particulate (e.g., dust) from the intake air prior to combustion. The filter element requires periodic replacement as the filter media of the filter element captures and removes particulate from the intake air passing through the filter media. Often, the filter element includes integrated covers, housings, and attachment features that are typically injection-molded plastic components. The injection-molded plastic components are provided in part for ease of filter element replacement. The plastic components help align the filter element and seal the filter element against the housing during replacement. However, the injection-molded plastic components have various drawbacks. The injection-molded plastic components account for a substantial percentage of the overall cost of the filter elements. Further, the injection-molded plastic components add to non-biodegradable waste when the plastic components are discarded with the spent filter media of the filter element.

SUMMARY

One example embodiment relates to an axial flow filter element. The axial flow filter element includes filter media having an inlet face and an outlet face, the inlet face is spaced apart from the outlet face. The axial flow filter element further includes an upper support ring adjacent to the inlet face of the filter media. The upper support ring circumscribes the filter media and supports an upper seal. The upper seal forms a seal with a housing when the filter element is received in the housing. The axial flow filter element further includes a lower support ring adjacent to the outlet face of the filter media. The lower support ring circumscribing the filter media. In some arrangements, the lower support ring does not include a seal.

Another example embodiment relates to a filtration system. The filtration system includes a housing having a cylindrical shape and a cover removably coupled to the housing through a mechanical connection. The filtration system further includes a filter element removably positioned within the housing. The filter element is an axial flow filter element. The filter element includes filter media including an inlet face and an outlet face. The inlet face is spaced apart from the outlet face. The filter element further includes an upper support ring adjacent to the inlet face of the filter media. The upper support ring circumscribes the filter media and supports an upper seal. The upper seal forms a seal with the housing when the filter element is received in the housing. The filter element includes a lower support ring adjacent to the outlet face of the filter media. The lower support ring circumscribes the filter media. The lower support ring does not include a seal configured to engage a surface of the housing.

A further example embodiment relates to a method of servicing a filtration system element. The method includes inserting an axial flow filter element into a filtration system housing. The axial flow filter element includes filter media that has an inlet face and an outlet face spaced part from the inlet face. The axial flow filter element has an upper support ring adjacent to the inlet face and circumscribing the filter media and a lower support ring adjacent to the outlet face. The upper support ring supports an upper seal member. The lower support ring does not include a seal configured to form a seal between the filtration system housing and the axial flow filter element. The method further includes compressing the seal member between a sealing surface of the filtration system housing and the upper support ring to form an axial seal.

These and other features, together with the organization and manner of operation thereof, will become apparent from the following detailed description when taken in conjunction with the accompanying drawings.

DETAILED DESCRIPTION

Referring to the figures generally, an axial flow air filtration system having a replaceable filter cartridge is described. The filter cartridge is an axial flow filter cartridge that includes an upper support ring and a lower support ring each circumscribing a filter media. The upper support ring supports an upper seal that forms an axial seal between the upper support ring and the housing of the filtration system. The upper seal prevents air from bypassing the filter element as the air flows through the housing. A cover of the housing may be used to compress the seal. In some arrangements, the lower support ring supports a lower seal member that forms a crush seal between the lower support ring and the housing. In other arrangements, the lower support ring supports a permeable media gasket that allows for some air flow between the housing and the lower support ring. In still further arrangements, the lower support ring does not support a seal or a permeable media gasket.

Figure 1:
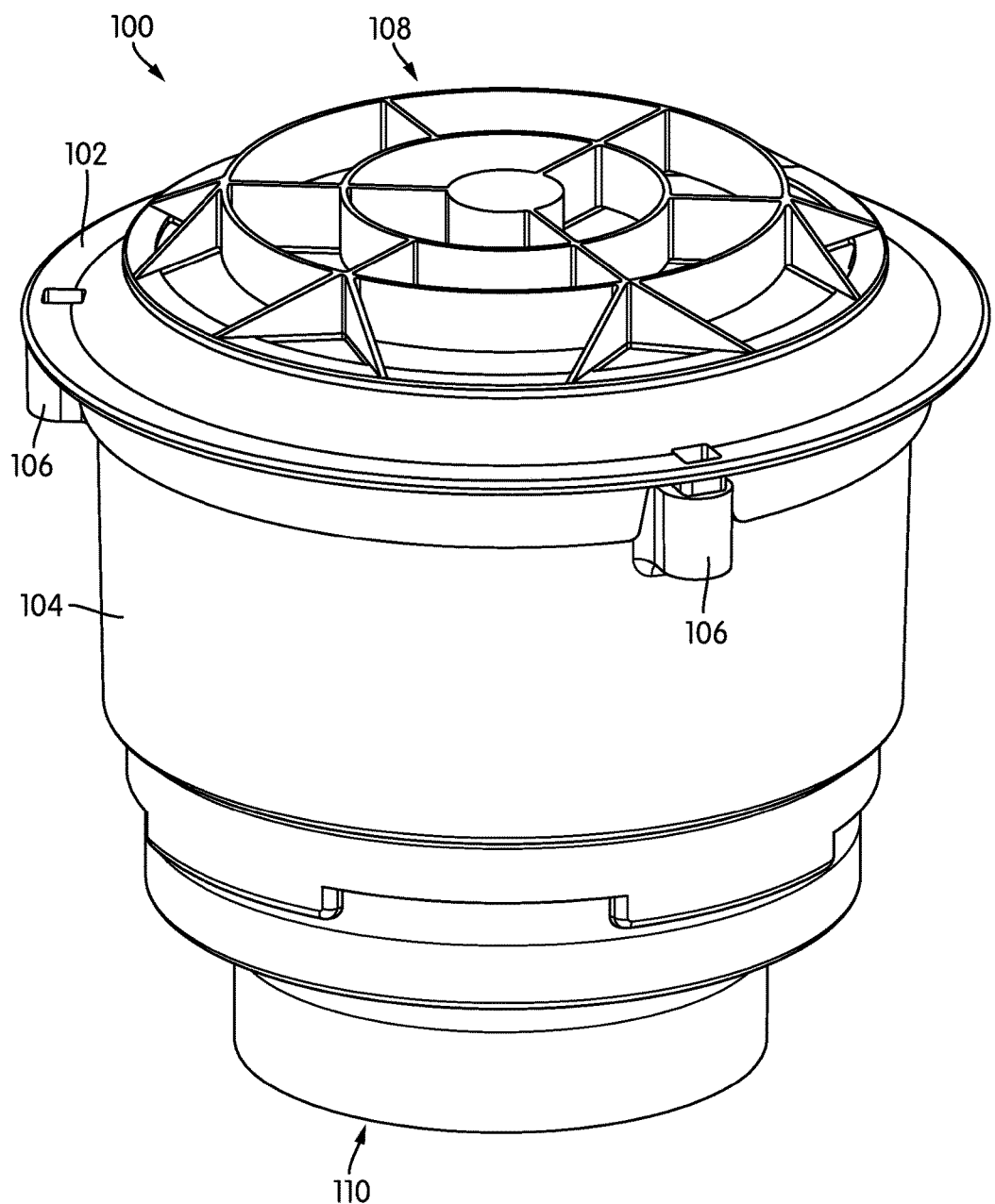
FIG. 1 is a perspective view of an air filtration system according to an exemplary embodiment.

Referring to FIG. 1, a perspective view of an air filtration system 100 is shown according to an exemplary embodiment. The system 100 filters air and provides clean air to a device, such as an internal combustion engine. The system 100 is shown with an upper member 102 secured to a housing 104. The upper member 102 is removably secured to the housing through a plurality of connections 106 formed between the upper member 102 and the housing 104. The connections 106 are formed by any suitable mechanical connection, such as snap-fit connections (e.g., formed by mating detents on the housing 104 and the upper member 102), screws, bolts, or the like. In some arrangements, the upper member 102 is an inlet grate. The upper member 102 includes an inlet opening 108, and the housing 104 includes an outlet opening 110. The inlet opening 108 and the outlet 110 are substantially aligned such that a common axis passes through the centers of the inlet opening 108 and the outlet opening 110. Air to be filtered by the system 100 enters the housing 104 through the inlet opening 108, passes through the housing 104, and exits the housing 104 through the outlet opening 110. As described in further detail below, the housing 104 includes a filter element 204 positioned between the inlet opening 108 and the outlet opening 110 such that the air passing through the housing 104 is filtered. Although the upper member 102 may contact certain portions of the filter element 204, the upper member 102 is not fixed to the filter element 204 such that the upper member 102 can be removed from the filter element 204 used with replacement filter elements. Since the upper member 102 is reusable with replacement filter elements, replacement filter elements can be produced at a lesser cost than replacement filter elements that have an integral cover portion. The reusable upper member 102 also reduces waste with each filter element replacement service in comparison to replacement filter elements that have an integral cover portion.

Figure 2:
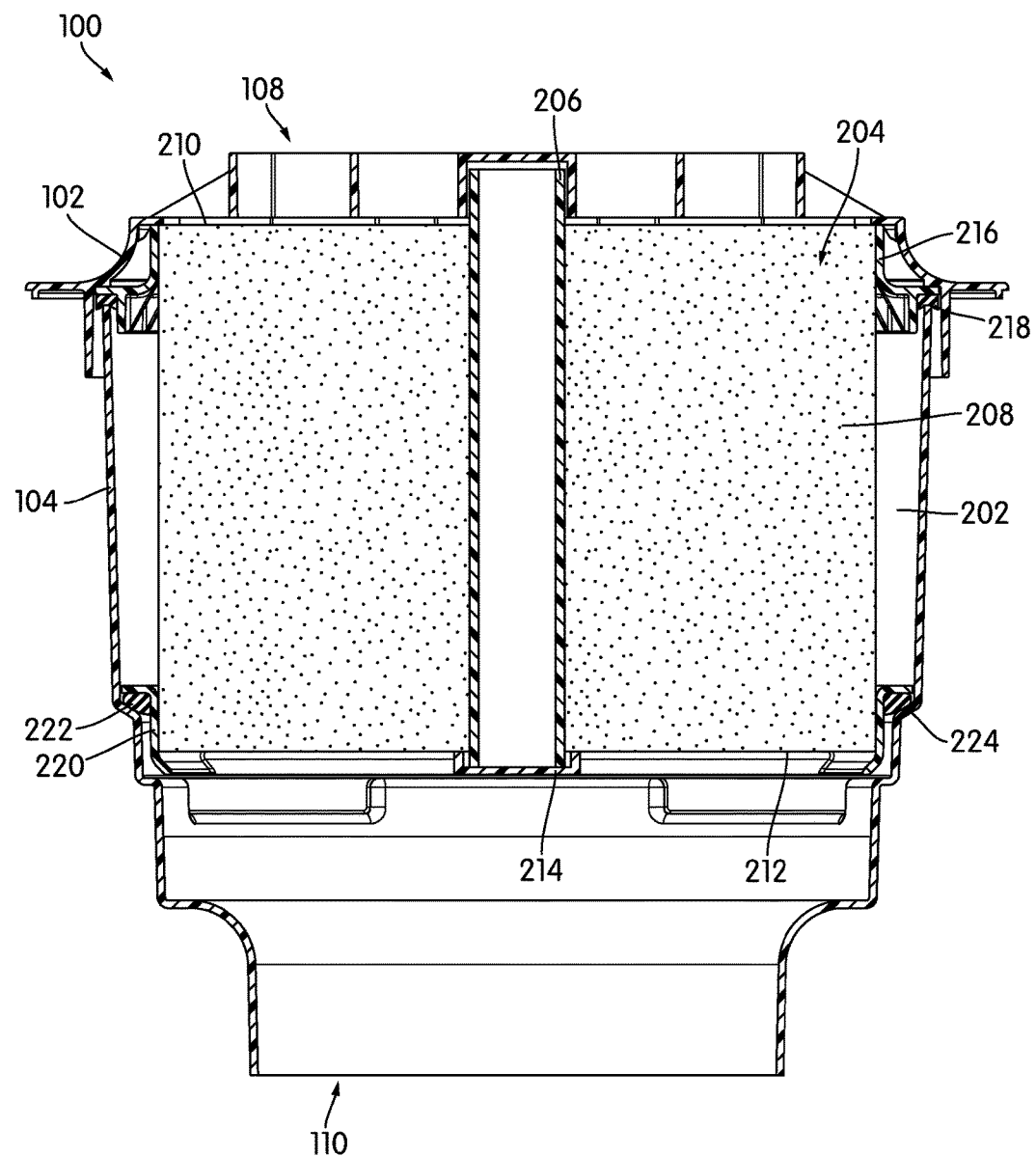
FIG. 2 is a cross-sectional view of the air filtration system of FIG. 1.
Figure 3:
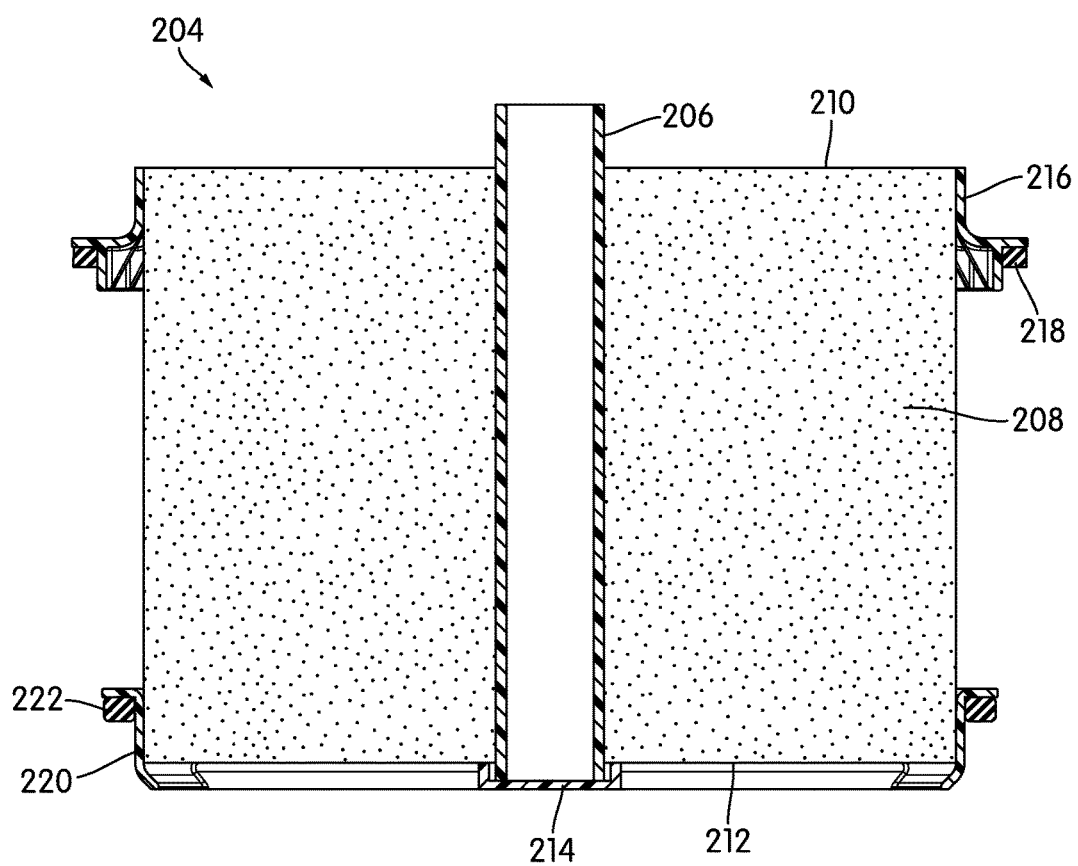
FIG. 3 is a cross-sectional view of the filter element of the air filtration system of FIG. 1 removed from the housing.

Referring to FIG. 2, a cross-sectional view of the system 100 is shown. The housing 104 includes a central compartment 202 positioned between the inlet opening 108 and the outlet opening 110. A filter element 204 is positioned in the central compartment 202. As shown in FIG. 2, the filter element 204 is in an installed position (i.e., the filter element 204 is received in the compartment 202 and the upper member 102 is secured to the housing 104). FIG. 3 shows a cross-sectional view of the filter element 204 removed from the housing 104. The filter element 204 is an axial flow filter element. The filter element 204 includes a central tube 206 and filter media 208 surrounding the central tube 206. In some arrangements, the central tube 206 is comprised of cardboard, which may be less expensive and more environmentally friendly than plastic. In one embodiment, the central tube 206 is not perforated or porous, although other embodiments may include perforations and/or a certain level of porosity. A portion of the central tube 206 extends into an opening in the upper member 102 when the filter element 204 is received in the housing 104 in an installed position. In an alternative arrangement, the central tube 206 does not extend into the upper member 102 and includes a cap to seal the top portion of the central tube 206. The filter media 208 includes an inlet face 210 that is substantially adjacent to the inlet opening 108 of the upper member 102. The filter media 208 includes an outlet face 212 that is substantially adjacent to the outlet opening 110. The inlet face 210 is spaced apart from the outlet face 212. The inlet face 210 is substantially parallel to the outlet face 212. In an alternative arrangement, the filter element 204 does not include a central tube. In such an arrangement, the filter media 208 may be wound around a removable core.

The filter media 208 may include pleated media, corrugated media, tetrahedral media, or variations thereof. U.S. Pat. No. 8,397,920, entitled "PLEATED FILTER ELEMENT WITH TAPERING BEND LINES," by Moy et al., filed on Oct. 14, 2011, and issued on Mar. 19, 2013, assigned to Cummins Filtration IP Inc., which is incorporated by reference in its entirety and for all purposes, describes a tetrahedral filter media. Some configurations of tetrahedral filter media include a plurality of inlet tetrahedron flow channels and a plurality of outlet tetrahedron flow channels. The inlet tetrahedron merge in a central portion of the filter material thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. The filter media 208 may be wound around the central tube 206. The central tube 206 is closed on both ends. A top end of the central tube 206 is closed by the upper member 102. In the embodiment depicted in FIGS. 1-5, a bottom end of the central tube is closed by a cap 214. However, it is possible for such a cap 214 to be used to close the top end of the central tube 206, either in place of or in addition to the use of a cap 214 on the bottom end of the central tube 206.

The filter element 204 includes an upper support ring 216. The upper support ring 216 circumscribes the filter media 208 adjacent the inlet face 210. The upper support ring 216 may be plastic, a polymer, or the like. In some arrangements, the upper support ring 216 is secured to the filter media 208 with an adhesive. In other arrangements, the upper support ring 216 is secured to the filter media 208 with a friction fit. The upper support ring 216 includes an upper seal 218. The upper seal 218 may be a flat gasket. The upper seal 218 may be an elastomeric seal. In some arrangements, the upper seal 218 is a molded polyurethane seal. When the filter element 204 is received within the housing 104, the upper seal 218 rests against an upper portion of the housing 104. The upper member 102 compresses the upper seal 218 against the housing 104 forming an axial seal between the upper support ring 216 and the housing 104. Accordingly, when the filter element 204 is received in an installed position within the housing, 104, air passing through the system 100 (i.e., from the inlet opening 108 to the outlet opening 110) is forced to pass through the filter media 208. Additionally, the upper seal 218 also prevents dust buildup on the inside walls of the housing 104 during operation.

The upper seal 218 is compressed by an axial sealing force. The force of the upper member 102 pressing down on the filter element 204 when the filter element 204 is received within the housing 104 assists in creating the upper seal. In some arrangements, the compression distance for the upper seal 218 caused by the upper member 102 is limited to approximately fifteen to forty percent of the upper seal 218. However, because the upper seal is created with an axial sealing force, the pressure differential caused by the filter element between the inlet face 210 and the outlet face 212 also assists in pressing the upper seal 218 against the housing 104. Accordingly, if a technician does not fully tighten the upper member 102 onto the housing 104, normal operational forces caused by the air pressure differential across the filter element 104 are sufficient to create the upper seal.

The filter element 204 includes a lower support ring 220. The lower support ring 220 circumscribes the filter media 208 adjacent the outlet face 212. The lower support ring 220 may be plastic, a polymer, or the like. In some arrangements, the lower support ring 220 is secured to the filter media 208 with an adhesive. In other arrangements, the lower support ring 220 is secured to the filter media 208 with a friction fit. The lower support ring includes a lower support element 222. The lower support element 222 may be an annular support element comprised of a porous and deformable material. In some arrangements, the lower support element is a permeable media gasket. In some arrangements, the lower support element 222 is comprised of an open foam, a lofty meltblown permeable media, or felt. When the filter element 204 is received within the housing 104 in an installed position, the lower support element 222 rests against an angled surface 224 of the housing 104. In some arrangements, attachment of the upper member 102 to the housing 104 compresses the lower support element 222 against the angled surface 224 when the filter element 204 is received within the housing 104 in an installed position. The lower support element 222 helps position and secure the filter element 204 during installation of the filter element 204 into the housing 104. After installation into the installed position, the lower support element 222 helps to retain the filter element 204 in the installed position and helps to reduce vibration of the filter element 204 during use. Further, the lower support element 222 reduces the risk of the filter element 204 vibrating against the housing 104, referred to as "chatter," during use of the filter element 204. Additionally, the lower support element 222 significantly reduces the surface friction between the filter element 204 and the housing 104 over a polyurethane seal. In some arrangements, the lower support ring 220 does not include a lower support element 222. In such arrangements, the upper seal 218 is the primary support surface between the housing 104 and the filter element 204 when the filter element 204 is received in the housing 104. In other arrangements, the filter element does not include a lower support ring 220.

Figure 4:
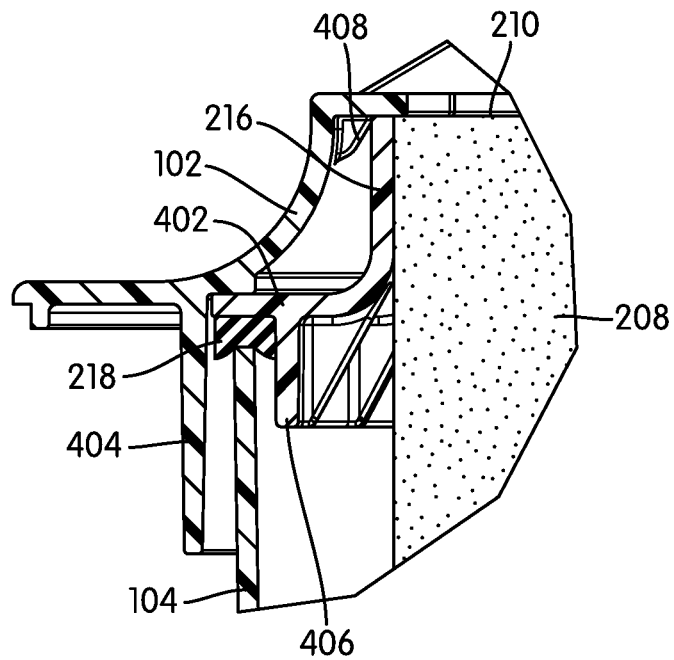
FIG. 4 is a close-up cross-sectional view of the axial seal formed by the upper seal of the air filtration system of FIG. 1.

Referring to FIG. 4, a close-up cross-sectional view of the axial seal formed by the upper seal 218 is shown. As described above, the upper support ring 216 circumscribes the filter media 208. The upper support ring 216 includes a radial projection 402 extending away from the outer surface of the filter media 208 and towards an axial extension 404 of the upper member 102. The upper support ring 216 includes an axial extension 406 extending towards the outlet face 212 of the filter media 208 (as shown in FIGS. 2 and 3). The radial projection 402 and the axial extension 404 form an L-shaped portion that supports the upper seal 218. The L-shaped portion supports the upper seal 218 at a position that is axially offset from the inlet face 210 of the filter media 208. In some arrangements, a top surface of the upper support ring 216 is substantially flush with the inlet face 210.

The upper member 102 includes an alignment ramp 408. During installation of the filter cartridge 204 in the housing 104, the upper member 102 is fit over the filter cartridge 204 that is received in the housing 104. As the upper member 102 is secured to the housing 104 (e.g., via the mechanical connection discussed above with respect to FIG. 1), the alignment ramp 408 interacts with the upper support ring 216 to center the filter element 204 within the central compartment 202. The alignment ramp 408 ensures proper alignment of the filter cartridge 204 into the installed position as the upper member 102 is secured to the housing 104.

Figure 5:
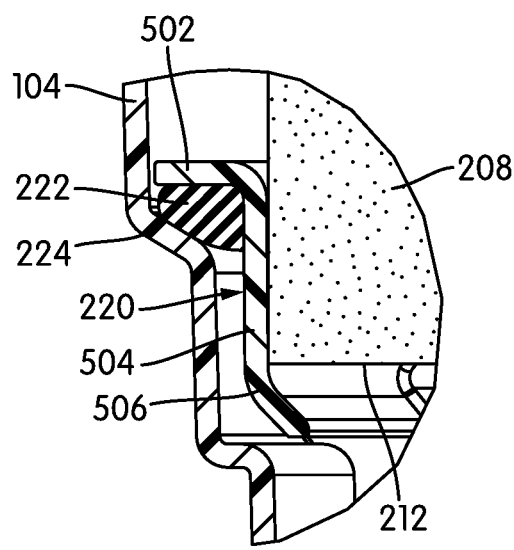
FIG. 5 is a close-up cross-sectional view of the lower support element of the air filtration system of FIG. 1.

Referring to FIG. 5, a close-up cross-sectional view of the lower support element 222 is shown. As described above, the lower support ring 220 circumscribes the filter media 208. The lower support ring 220 includes a radial projection 502 extending away from the outer surface of the filter media 208 and towards the inner wall of the housing 104. The lower support ring 220 includes an axial surface 504 extending along the outer surface of the filter media 208. The radial projection 502 and the axial surface 504 form an L-shaped portion that supports the lower support element 222. The L-shaped portion supports the lower support element 222 at a position that is axially offset from the outlet face 212 of the filter media 208. The L-shaped portion aligns the lower seal with the angled surface 224 of the housing 104 when the filter element 204 is positioned in the installed position within the housing 104. The lower support ring 220 includes an extension portion 506 that extends past the outlet face 212 of the filter media 208. The extension portion 506 extends at an inward angle towards the center of the filter media 208 such that the extension portion 506 extends over and covers a portion of the outlet face 212. The extension portion 506 protects the outlet face 212 of the filter media 208 during insertion of the filter element 204 into the housing such that the outlet face 212 is not accidentally crushed or damaged during installation. In an alternative arrangement, the lower support ring 220 does not include a lower support element 222 (e.g., the filter element 204 includes only an upper seal). In such an arrangement, the lower support ring 220 circumscribes the filter media 208 and supports the filter media 208 during operation.

The lower support element 222 is coupled to the lower support ring 220. When the filter element 204 is received in the installed position within the housing 104, the lower support element 222 does not form a seal between the lower support ring 220 and the angled surface 224 because air can pass through the lower support element 222. In particular embodiments, the lower support element 222 is less air permeable than that of the filter media 208, thereby providing a path of less air resistance through the filter media 208 and ensuring efficient filtration of air flowing through the housing 104. Where an elastomeric seal would not allow any air to permeate through or around the seal, the lower support element 222 allows a very small amount of airflow to pass through while filtering out larger harmful contaminants such as debris, leaf portions, etc. In some arrangements, the lower support element 222 serves as a secondary filter element.

Figure 6:
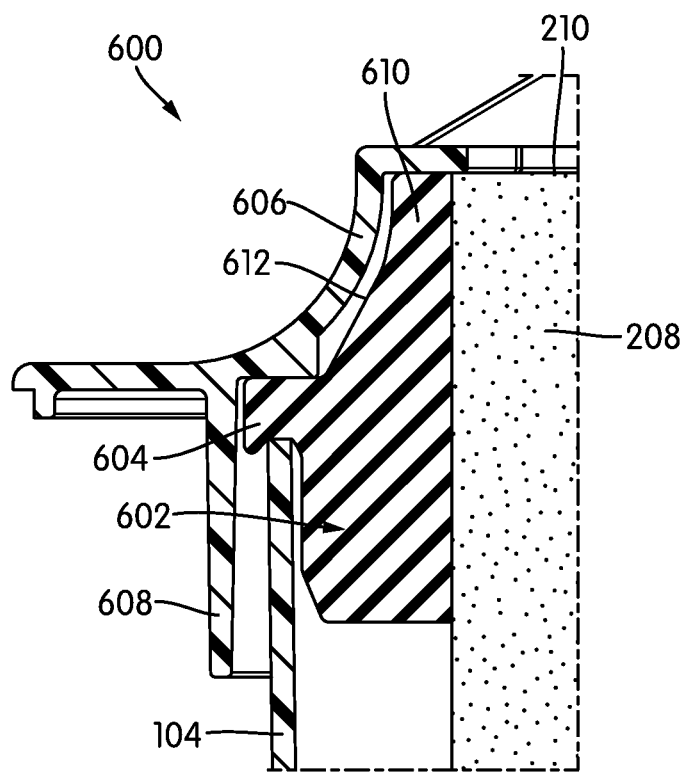
FIG. 6 is a close-up cross-sectional view of an upper seal of a filter element according to an additional example embodiment.

Referring to FIG. 6, a close-up cross-sectional view of an upper seal 600 is shown according to an exemplary embodiment. The upper seal 600 of FIG. 6 may be substituted for the upper seal 218 and upper support ring 216 of the filter element 204. Like numbering is used between FIG. 6 and FIGS. 1-5 where like parts are described. The upper seal 600 includes a seal member 602 that circumscribes the filter media 208. The seal member 602, in a particular implementation, is a polyurethane molded seal member. The seal member 602 is not supported by a polymeric frame as discussed above with respect to the system 100. The seal member 602 includes a radial projection 604 that extends away from the outer surface of the filter media 208 and towards an axial extension 608 of an upper member 606. Similar to upper member 102, the upper member 606 may be an inlet grate. The seal member 602 includes an axial extension 610 extending towards the inlet face 210 of the filter media 208. The end of the axial extension 610 is substantially flush with the inlet face 210. When the filter element 204 is received in the installed position within the housing 104, the upper seal 600 is formed by the radial projection 604 being pressed between a top end of the housing 104 and the upper member 606. Unlike upper member 102, upper member 606 does not include alignment ramps. The seal member includes a ramp surface 612 that interacts with the upper member 606 to properly align the filter element 204 within the housing 104 during installation.

Figure 7A:
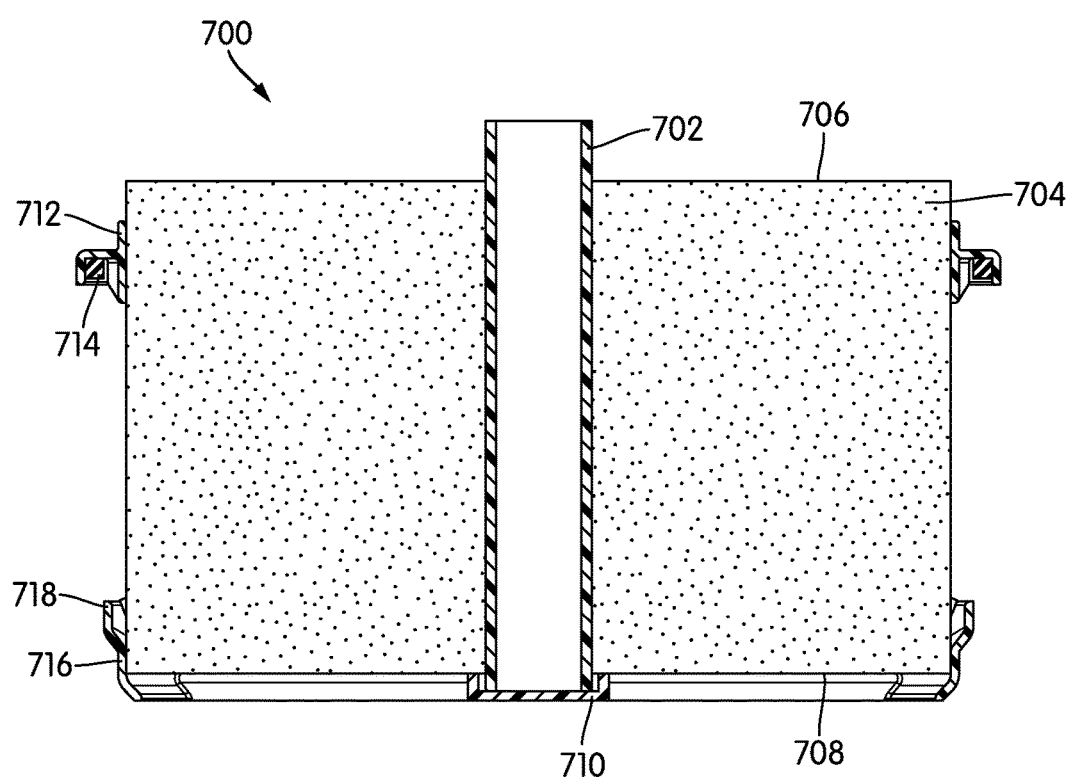
FIGS. 7A and 7B show various views of a filter element according to a further example embodiment.
Figure 7B:
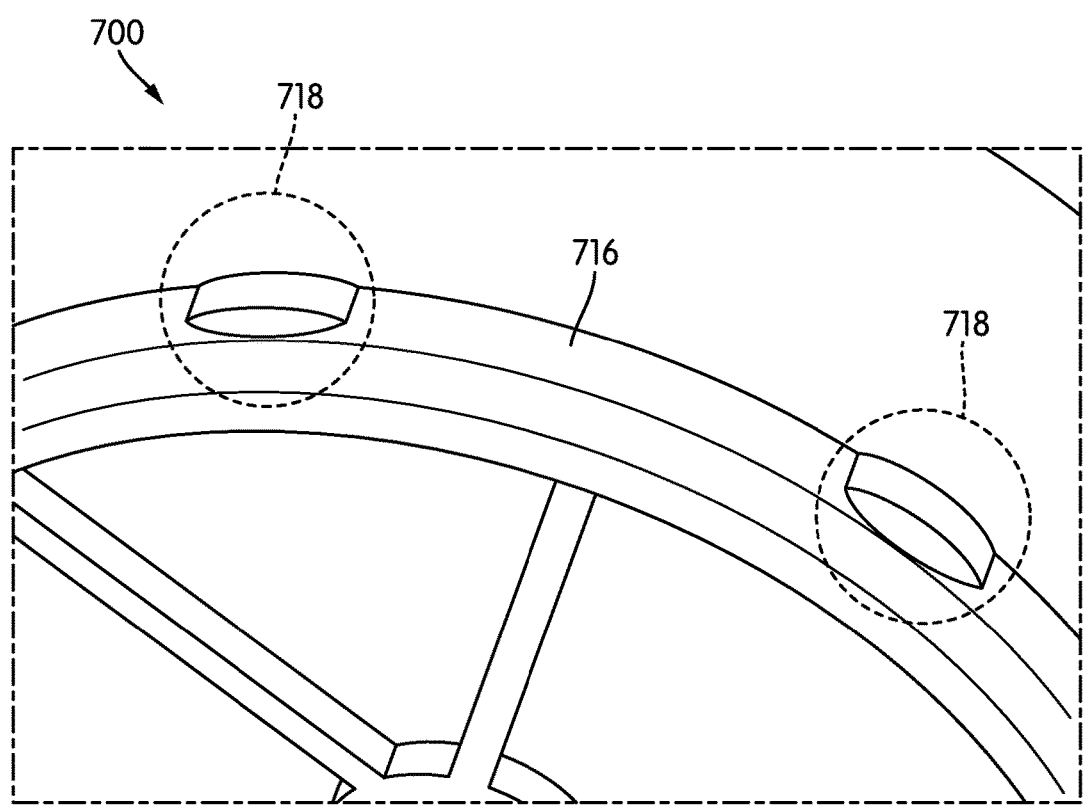

Referring to FIGS. 7A and 7B, a cross-sectional view of a filter element 700 and a close-up perspective view of the filter element 700 is shown according to a further embodiment. The filter element 700 is similar to the filter element 204. The filter element 700 is an axial flow filter element. The filter element 700 may be positioned in the central compartment 202 of the housing 104 in a similar manner as described above with respect to filter element 204. The primary difference between the filter element 700 and the filter element 204 is that filter element 700 does not include a lower seal that is configured to seal against a surface of the housing. The filter element 700 includes a central tube 702 and filter media 704 surrounding the central tube 702. In some arrangements, the central tube 702 is comprised of cardboard, which is less expensive and more environmentally friendly than plastic. A portion of the central tube 702 extends into an opening in the upper member 102 when the filter element 700 is received in the housing 104 in an installed position (in a similar manner as shown in FIG. 2 with respect to filter element 204). The filter media 704 includes an inlet face 706 and an outlet face 708. The inlet face 706 is spaced apart from the outlet face 708. The inlet face 706 is substantially parallel to the outlet face 708.

The filter media 704 may include pleated media, corrugated media, tetrahedral media, or variations thereof. As discussed above, some configurations of tetrahedral filter media include a plurality of inlet tetrahedron flow channels and a plurality of outlet tetrahedron flow channels. The inlet tetrahedron merge in a central portion of the filter material thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. The filter media 704 may be wound around the central tube 702. The central tube 702 is closed on both ends. A top end of the central tube is closed by the upper member 102 when the filter element 700 is received within the housing 104 in an installed position. A bottom end of the central tube is closed by a cap 710.

The filter element 700 includes an upper support ring 712. The upper support ring 712 is similar to the upper support ring 216 of the filter element 204. The upper support ring 712 circumscribes the filter media 704 adjacent the inlet face 706. The upper support ring 712 may be plastic, a polymer, or the like. In some arrangements, the upper support ring 712 is secured to the filter media 704 with an adhesive (e.g., a hot melt adhesive). In other arrangements, the upper support ring 712 is secured to the filter media 704 with a friction fit. The upper support ring 712 includes an upper seal 714. The upper seal 714 may be a flat gasket. The upper seal 714 is an elastomeric seal. In some arrangements, the upper seal 714 is polyurethane. When the filter element 700 is received within the housing 104, the upper seal 714 rests against an upper portion of the housing 104. The upper member 102 compresses the upper seal 714 against the housing 104 forming an axial seal between the upper support ring 712 and the housing 104. Accordingly, when the filter element 700 is received in an installed position within the housing, 104, air passing through the system 100 (i.e., from the inlet opening 108 to the outlet opening 110) is forced to pass through the filter media 704.

The upper seal 714 is sealed with an axial sealing force. The force of the upper member 102 pressing down on the filter element 700 when the filter element 700 is received within the housing 104 assists in creating the upper seal. In some arrangements, the compression distance for the upper seal 714 caused by the upper member 102 is limited to approximately fifteen to forty percent of the upper seal 714. Further, because there is no lower seal (e.g., as in filter element 204), the insertion force needed to properly install the filter element 700 is less than the insertion force needed to properly install the filter element 204. However, because the upper seal 714 is an axial seal, the pressure differential caused by the filter element between the inlet face 706 and the outlet face 708 also assists in pressing the upper seal 714 against the housing 104. Accordingly, if a technician does not fully tighten the upper member 102 onto the housing 104, normal operational forces caused by the air pressure differential across the filter element 700 are enough to create the upper seal.

The filter element 700 includes a lower support ring 716. The lower support ring 716 is similar to the lower support ring 220 of filter element 204 except that the lower support ring 716 does not include a lower support element 222. The lower support ring 716 circumscribes the filter media 704 adjacent the outlet face 708. The lower support ring 716 may be plastic, a polymer, or the like. In some arrangements, the lower support ring 716 is secured to the filter media 704 with an adhesive. In other arrangements, the lower support ring 716 is secured to the filter media 704 with a friction fit. The lower support ring 716 does not include a lower seal or a lower support element that rests against the housing 104. The lower support ring 716 includes a plurality of arced protrusions 718 (e.g., six equally spaced arced protrusions) along the circumference of the support ring 716. The arced protrusions 718 help support and stabilize the filter element within the housing 104 without creating a bottom frame seal against the housing 104. When the filter element 700 is received within the housing 104 in an installed position, the lower support ring 716 protects the outlet face 710 of the filter media 704 from being damaged against the interior of the housing 104. In some arrangements where there is minimal lateral vibration of the filter element 700, it is possible to eliminate the lower support ring 716 altogether.

Figure 8:
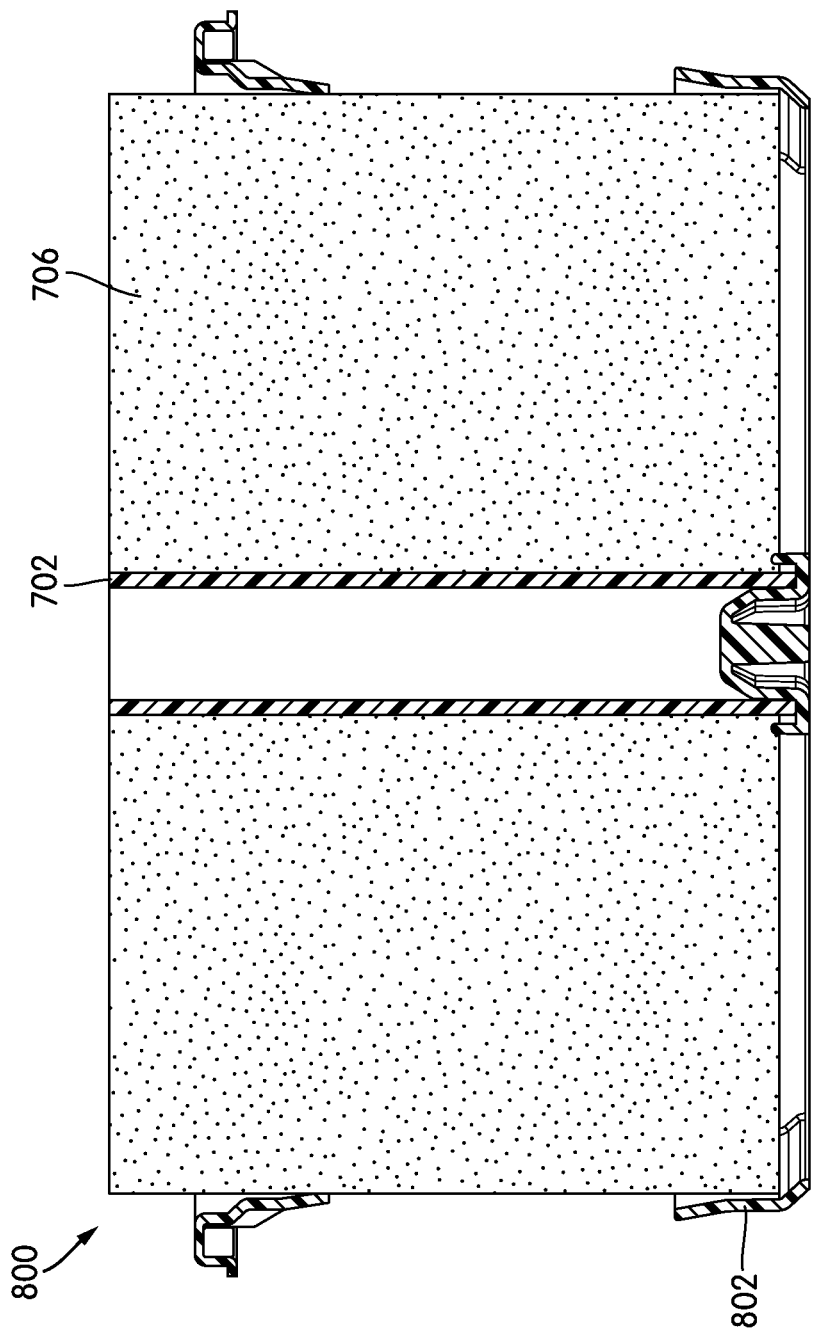
FIG. 8 is a cross-sectional view of a filter element according to still another example embodiment.

Referring to FIG. 8, a cross-sectional view of a filter element 800 is shown according to another embodiment. The filter element 800 is substantially similar to the filter element 700. Accordingly, like numbering is used in FIG. 8 to designate the similar components between the filter element 800 and the filter element 700. The primary difference between the filter element 800 and the filter element 700 is that the lower support ring 802 of the filter element 800 does not include arced protrusions (e.g., arched protrusions 718). As such, the lower support ring 802 is substantially uniform in diameter around the entire circumference of the lower support ring 802. Additionally, the upper support ring 804 that supports the upper seal 806 of the filter element 800 has a slightly different cross-sectional shape than the upper support ring 712 of the filter element 700. The upper seal 806 functions in the same manner as described above with respect to the upper seal 714.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" or "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An axial flow filter element comprising:
    filter media including an inlet face and an outlet face, the inlet face spaced apart from the outlet face;
    an upper support ring adjacent to the inlet face of the filter media, the upper support ring circumscribing the filter media and supporting an upper seal, the upper seal forming a seal with a housing when the filter element is received in the housing;
    a lower support ring adjacent to the outlet face of the filter media, the lower support ring circumscribing the filter media, wherein the lower support ring does not include a seal configured to engage a surface of the housing; and
    a lower support element coupled to the lower support ring, the lower support element positioned such that the lower support element rests against a surface of the housing when the filter element is received in the housing, wherein the lower support element does not form a seal between the lower support ring and the housing;
    wherein the lower support element is a permeable media gasket.

2. The filter element of claim 1, wherein the permeable media gasket is comprised of a felt, an open foam, or a meltblown media.

3. The filter element of claim 1, wherein the permeable media gasket is less air permeable than the filter media.

4. The filter element of claim 1, wherein the filter media is a tetrahedral filter media.

5. The filter element of claim 1, further comprising a cover having an inlet opening adjacent to the inlet face of the filter media, wherein the cover is removable from the filter media such that the cover can be used with replacement filter elements.

6. The filter element of claim 5, wherein the cover includes an alignment ramp configured to interact with the upper support ring to center the filter media with respect to the cover when the cover is positioned over the filter media.

7. The filter element of claim 1, further comprising a central tube, wherein the filter media surrounds the out periphery of at least a portion of the central tube.

8. The filter element of claim 1, wherein the upper support ring includes a radial projection extending away from an outer surface of the filter media and an axial extension extending towards the outlet face, the radial projection and the axial extension forming an L-shaped portion, wherein the upper seal is supported by the L-shaped portion.

9. The filter element of claim 8, wherein the upper seal is axially offset from the inlet face of the filter media.

10. A filtration system comprising:
    a housing;
    a cover removably coupled to the housing through a mechanical connection; and a filter element removably positioned within the housing, the filter element being an axial flow filter element, the filter element comprising:
    filter media including an inlet face and an outlet face, the inlet face spaced apart from the outlet face,
    an upper support ring adjacent to the inlet face of the filter media, the upper support ring circumscribing the filter media and supporting an upper seal, the upper seal forming a seal with the housing when the filter element is received in the housing,
    a lower support ring adjacent to the outlet face of the filter media, the lower support ring circumscribing the filter media, wherein the lower support ring does not include a seal configured to engage a surface of the housing; and
    a lower support element coupled to the lower support ring, the lower support element positioned such that the lower support element rests against a surface of the housing when the filter element is received in the housing, wherein the lower support element does not form a seal between the lower support ring and the housing;
    wherein the lower support element is a permeable media gasket.

11. The filtration system of claim 10, wherein the permeable media gasket is comprised of a felt, an open foam, or a meltblown media.

12. The filtration system of claim 10, wherein the permeable media gasket is less air permeable than the filter media.

13. The filtration system of claim 10, wherein the filter media is a tetrahedral filter media.

14. The filtration system of claim 10, wherein the cover includes an inlet opening adjacent to the inlet face of the filter media, wherein the cover removable from the filter media such that the cover can be used with replacement filter elements.

15. The filtration system of claim 14, wherein the cover includes an alignment ramp configured to interact with the upper support ring to center the filter element within the housing.

16. The filtration system of claim 10, wherein the filter element further comprises a central tube, and wherein the filter media surrounds the out periphery of at least a portion of the central tube.

17. The filtration system of claim 10, wherein the upper support ring includes a radial projection extending away from an outer surface of the filter media and an axial extension extending towards the outlet face, the radial projection and the axial extension forming an L-shaped portion, wherein the upper seal is supported by the L-shaped portion.

18. The filter element of claim 17, wherein the upper seal is axially offset from the inlet face of the filter media.

19. A method of servicing a filtration system comprising:
    inserting an axial flow filter element into a filtration system housing, the axial flow filter element including filter media having an inlet face and an outlet face spaced part from the inlet face, the axial flow filter element having an upper support ring adjacent to the inlet face and circumscribing the filter media, a lower support ring adjacent to the outlet face, and a lower support element coupled to the lower support ring, the upper support ring supporting an upper seal member, the lower support ring does not include a seal configured to form a seal between the filtration system housing and the axial flow filter element, and the lower support element is positioned such that the lower support element rests against a surface of the filtration system housing when the filter element is received in the filtration system housing, wherein the lower support element does not form a seal between the lower support ring and the filtration system housing and is a permeable media gasket; and
    compressing the seal member between a sealing surface of the filtration system housing and the upper support ring to form an axial seal.

20. The method of claim 19, wherein the permeable media gasket is comprised of a felt, an open foam, or a meltblown media.

21. The method of claim 19, wherein the permeable media gasket is less air permeable than the filter media.

22. An axial flow filter element comprising:
    filter media including an inlet face and an outlet face, the inlet face spaced apart from the outlet face;
    an upper support ring adjacent to the inlet face of the filter media, the upper support ring circumscribing the filter media and supporting an upper seal, the upper seal forming a seal with a housing when the filter element is received in the housing;
    a lower support ring adjacent to the outlet face of the filter media, the lower support ring circumscribing the filter media and including a radial projection extending away from an outer surface of the filter media and an axial surface extending along the outer surface of the filter media, wherein the lower support ring does not include a seal configured to engage a surface of the housing; and
    a permeable media gasket coupled to the lower support ring.

23. The filter element of claim 22, wherein the radial projection and the axial surface form an L-shaped portion.

24. The filter element of claim 22, wherein the lower support ring includes an extension portion that extends past the outlet face of the filter media, the extension portion protecting the outlet face of the filter media during insertion of the filter element into the housing.

* * * * *